US008074221B2

(12) United States Patent
Rai

(10) Patent No.: US 8,074,221 B2
(45) Date of Patent: Dec. 6, 2011

(54) JOB ALLOCATION METHOD FOR DOCUMENT PRODUCTION

(75) Inventor: Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1174 days.

(21) Appl. No.: 11/763,079

(22) Filed: Jun. 14, 2007

(65) Prior Publication Data

US 2008/0313635 A1 Dec. 18, 2008

(51) Int. Cl.
*G06F 9/46* (2006.01)
*G06F 15/173* (2006.01)

(52) U.S. Cl. .................. 718/101; 709/239
(58) Field of Classification Search .............. None
See application file for complete search history.

(56) References Cited

U.S. PATENT DOCUMENTS 7,051,328 B2 5/2006 Rai et al.
7,065,567 B1 6/2006 Squires et al.

OTHER PUBLICATIONS

Dueck et al, "Threshold Accepting: A General Purpose Optimization Algorithm Appearing Superior to Simulated Annealing", Journal of Computational Physics 90, 1990, pp. 161-175, Academic Press, Inc.
Rai et al, "A Lean Document Production Controller for Printshop Management", Proceedings of the 42nd IEEE Conference on Decision and Control, Maui, Hawaii, Dec. 2003.

*Primary Examiner* — Meng An
*Assistant Examiner* — Eric Wai
(74) *Attorney, Agent, or Firm* — Pepper Hamilton LLP

(57) ABSTRACT

Methods and systems of processing print jobs are disclosed. A feasible route for processing each of a plurality of jobs is determined. For each feasible route, the time to process the job via the feasible route is determined. Each job is assigned to a first feasible route. A first objective function value is determined using a time to process each job assigned to each autonomous cell. A job is selected. A second feasible route is selected for the selected job. A second objective function value is determined by substituting the second feasible route for the first feasible route for the selected job. If the first value plus a threshold exceeds the second value, the second value replaces the first value, and the second feasible route replaces the first feasible route. Selection and substitution are repeated for each job. The jobs are then processed.

16 Claims, 3 Drawing Sheets

JOB ALLOCATION METHOD FOR DOCUMENT PRODUCTION

CROSS-REFERENCE TO RELATED APPLICATIONS

This application is related to U.S. Pat. No. 7,051,328, filed Jan. 26, 2001, U.S. Pat. No. 7,065,567, filed Nov. 3, 2000, and U.S. patent application Ser. No. 11/550,504, filed Oct. 18, 2006, each of which is incorporated herein by reference in its entirety.

BACKGROUND

1. Technical Field

The present disclosure generally relates to printing systems and methods, and especially methods ad systems for improving the performance of workflow in a production environment, such as a document production environment or printing environment. More particularly, the present disclosure relates to systems and methods for improving the routing of jobs, such as print jobs, in a production environment.

2. Background

Document production environments, such as print shops, convert printing orders, such as print jobs, into finished printed material. A print shop m-ay process print jobs using resources, such as printers cutters, collators and other similar equipment. Typically resources in print shops are organized such that when a print job arrives from a customer at a particular print shop, the print job can be processed by performing one or more production functions.

Scheduling architectures that organize print jobs received by a document production environment and route the print jobs are known in the art. Exemplary scheduling architectures are described in, for example. U.S. Pat. No. 7,051,328 to Rai et al. and U.S. Pat. No. 7,065,567 to Squires et al. The exemplary architectures receive print jobs and route the print jobs to autonomous cells. Autonomous cells typically include one or more resources needed to completely process an entire job.

The exemplary scheduling architectures appropriately route print jobs in many cases. However, in some cases, the allocation of print jobs using such algorithms can be unbalanced among autonomous cells. If print job allocation is unbalanced among autonomous cells, the overall efficiency of the document production environment could be reduced. This could manifest itself by having, more print jobs complete late, having late jobs complete later than otherwise necessary, and/or underutilizing particular resources.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "Job" is a reference to one or more jobs and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a computer-implemented method of processing a plurality of print jobs in a document production environment may include, for each of a plurality of print jobs, determining, by a print job workflow management system, a number of feasible routes (each including at least one resource in at least one of a plurality of autonomous cells) for processing the print job; for each feasible route, determining a job processing time including an amount of time required to process the print job via the feasible route, and assigning, by the print job workflow management system, the print job to a first feasible route. The method may further include determining, by the print job workflow management system, a first value for an objective function based on a total processing time for each autonomous cell to process each print job assigned to the autonomous cell, selecting a print job based on the number of feasible routes for each print job, selecting a second feasible route for the selected print job based on the job processing time for each feasible route for the selected print job, determining, by the print job workflow management system, a second value for the objective function based on the total processing time for each autonomous cell to process each print job assigned to the autonomous cell including the second feasible route, reassigning, by the print job workflow management system, the selected print job to the second feasible route if the second value is less than a third value, replacing the first value with the second value if the second value is less than a third value, repeating at least said selecting a print job, said selecting a second feasible route, and said determining a second value a plurality of times for each of the plurality of print jobs, and processing the plurality of print jobs based on the assigned feasible roues.

In an embodiment, a system for processing a plurality of print jobs in a document production environment may include a plurality of autonomous cells and a print job workflow management system. The plurality of autonomous cells may be configured to process print jobs. The print job workflow management system may be configured to, for each of a plurality of print jobs, determine a number of feasible routes for processing the print job, wherein each feasible route (each including at least one resource in at least one of a plurality of autonomous cells) including at least one resource in at least one of the plurality of autonomous cells, for each feasible route, determine a job processing time comprising an amount of time required to process the print job via the feasible route, and assign the print job to a first feasible route. The print job workflow management system may further be configured to determine a first value for an objective function based on a total processing time for each autonomous cell to process each print job assigned to the autonomous cell, select a print job based on the number of feasible routes for each print job, select a second feasible route for the selected print job based on the job processing time for each feasible route for the selected print job, determine a second value for the objective function based on the total processing time for each autonomous cell to process each print job assigned to the autonomous cell including the second feasible route, and if the second value is less than a third value, reassign the selected print job to the second feasible route, and replace the first value with the second value. The print job workflow management system may be configured to perform at least said selecting a print job, said selecting a second feasible route, and said determining a second value a plurality of times for each of the plurality of print jobs.

In an embodiment, a computer-implemented method of processing a plurality of print jobs may include, for each of a plurality of print jobs, assigning a first feasible route selected from a plurality of feasible routes, wherein each of the plurality of feasible routes comprises at least one resource in at least one of a plurality of autonomous cells, wherein each of the plurality of autonomous cells comprises one or more resources, determining a first value for an objective function based on a total processing time for each of the plurality of autonomous cells to process each print job assigned to the autonomous cell, selecting one of the plurality of print jobs based on the number of feasible routes for each of the plurality of print jobs, selecting a second feasible route for the selected print job based on the job processing time for each feasible route for the selected print job, determining, by the print job workflow management system, a second value for the objective function based on the total processing time for each autonomous cell to process each print job assigned to the autonomous cell including the second feasible route, reassigning, by the print job workflow management system, the selected print job to the second feasible route if the second value is less than the sum of the first value and a threshold, replacing the first value with the second value if the second value is less than the sum of the first value and a threshold, and processing the plurality of print jobs based on the assigned feasible routes.

BRIEF DESCRIPTION OF THE DRAWINGS

Aspects features, benefits and advantages of the present invention will be apparent with regard to the following description and accompanying drawings, of which.

DETAILED DESCRIPTION

For purposes of the discussion below, a "document production environment" refers to an entity that includes a plurality of resources, such as printers, cutters, collators, inserters, shrink wrappers and the like, for producing documents. The document production environment may be a freestanding entity, including one or more print-related devices, or it may be part of a corporation or other entity. Additionally, the document production environment may communicate with one or more servers by way of a local area network (LAN) or a wide area network (WAN), such as the Internet, the World Wide Web or the like.

The term "device" refers to a machine used to perform an operation. Exemplary devices in a document production environment include printers, cutters, collators, inserters, shrink wrappers and the like.

A "resource" refers to an element of a document production environment that performs a function. A resource can be a device or manpower. For example, in a document production environment, a human operator may be required to transport an intermediate work product, such as a printed document, between or among autonomous cells or within an autonomous cell as part of a job.

An "autonomous cell" refers to one or more resources that can be used to completely perform a job of at least one type. An autonomous cell includes at least one device.

A "job" refers to a logical unit of work that is to be completed for a customer. For example, a job may include one or more instructions and one or more parameters that, when processed, result in an output. In a document production environment, a job may include one or more print jobs from one or more clients. A production system may produce a plurality of jobs.

A "print job" refers to a job that is processed in a document production environment. For example, a print job may include one or more instructions and one or more parameters that, when processed, result in printed documents such as credit card statements corresponding to a certain credit card company, bank statements corresponding to a certain bank or the like.

Figure 1:
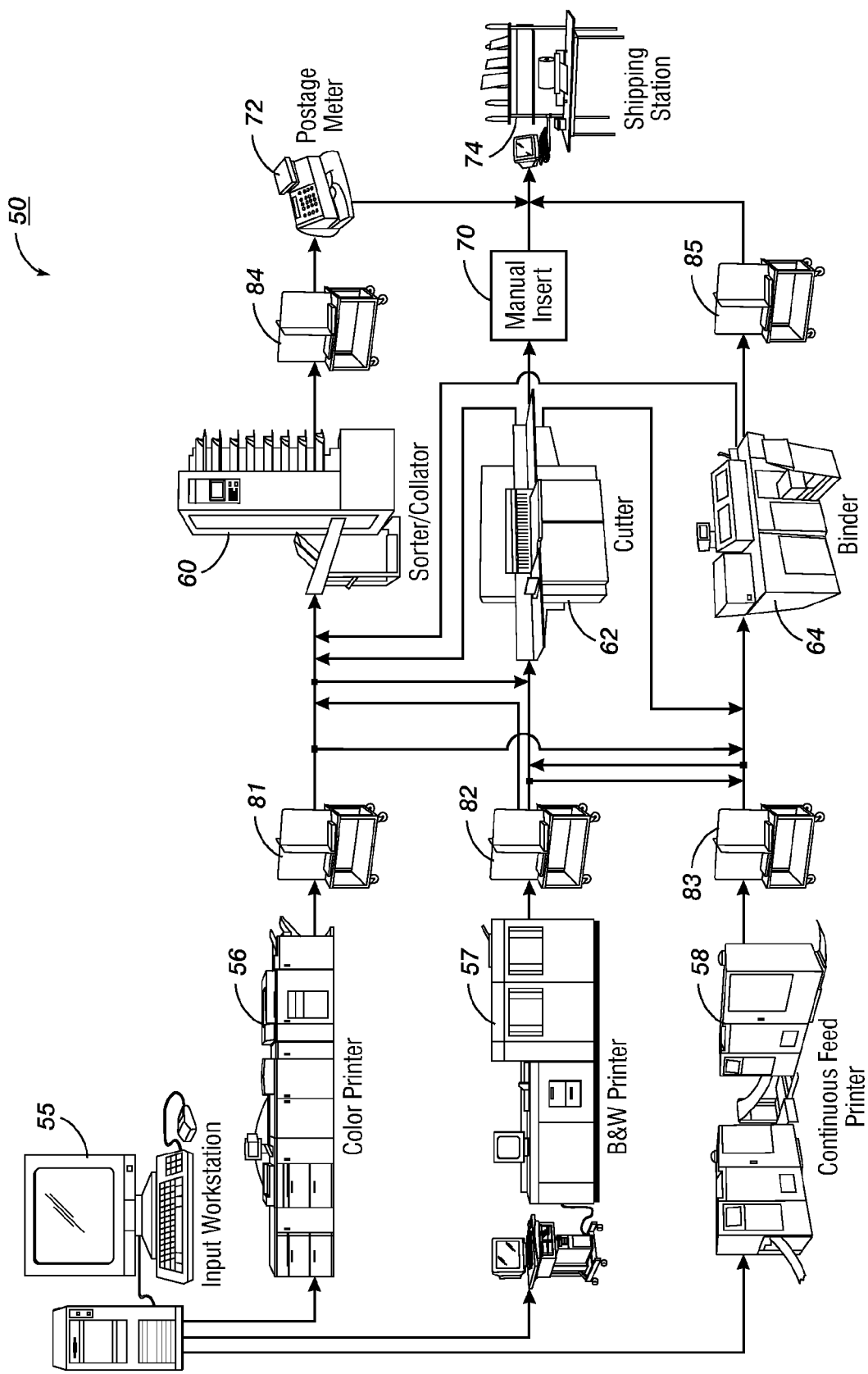
FIG. 1 depicts exemplary elements of a document production environment according to an embodiment.

FIG. 1 shows an example of a production environment 50, in this case, exemplary elements of a document production environment. Print jobs may enter the document production environment manually or electronically and be collected at an electronic submission system 55 such as a computing device and/or scanner. Print jobs are sorted and batched at the submission system, or another location before being delivered to one or more print engines such as a color printer 56, black-and-white printer 57 and/or a continuous feed printer 58. Printed documents may exit the print engine and be delivered to one or more finishing devices or areas such as a collator 60, cutter 62 and/or binder 64. The finishing areas may include automatic or manual areas for such finishing activities, and they also may include an automatic or manual inserter 70. Finally, the documents may move to a postage metering station 72 and/or shipping station 74. Documents for jobs may move from one location to another in the document production environment by automatic delivery or manual delivery such as by hand or by one or more paper carts 81-85.

Different elements of a production environment may require setup time in order to prepare the device to process a particular job. For example some print jobs use pre-printed forms, such as bank statements that are pre-printed with the bank's logo and contact information or credit card statements pre-printed with charge dispute procedures. Forms also may include inserts such as marketing materials or subscription cards. If a device in a document production environment receives two consecutive print jobs that use identical forms, little or no changeover is required between the two print jobs. However, if the forms are different, the print jobs have different setup characteristics, and a significant setup time may be required to load the new form into the machine. This is especially noticeable in continuous feed printing devices 58, where it can take up to 15 minutes or more to load a new form roll.

Figure 2:
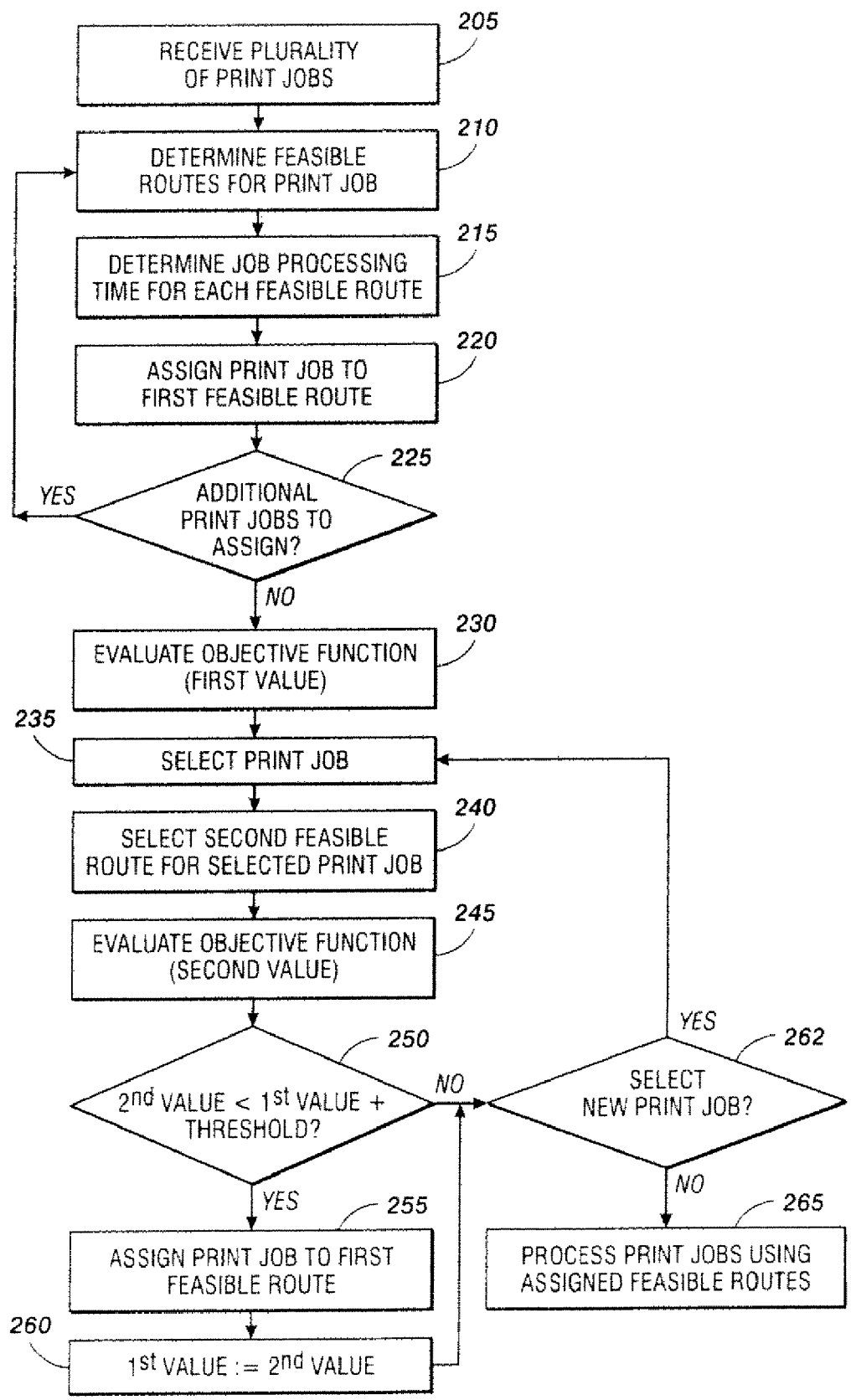
FIG. 2 depicts a flow diagram for an exemplary method of processing a plurality of print jobs in a document production environment according to an embodiment.

FIG. 2 depicts a flow diagram for an exemplary method of processing a plurality of print jobs in a document production environment according to an embodiment. The document production environment may be organized into a plurality of autonomous cells. Each autonomous cell groups together a set of resources. Equipment may include, for example and without limitation, a printer, a binder, a shrink wrapping machine, an inserter, a sorter and/or the like. While some print jobs may only be able to be processed by one autonomous cell, most print jobs may be processed in their entirety by more than one autonomous cell. As such, a print job may be routed to any autonomous cell (or set of autonomous cells) that can perform all of the operations for the print job.

As shown in FIG. 2, a plurality of print jobs may be received 205 by a print job work low management system associated with the document production environment. The print job workflow management system is a system that determines the manner in which a set of print jobs are processed in a document production environment. The print job workflow management system includes a processor and a processor-readable storage medium that contains programming instructions that, when executed, determine the resources used to process each print job and the sequence in which the resources are used to process each print job. The print job workflow management system then directs the resources in the document production environment to process the print jobs according to the determined sequence. Each print job may have a corresponding set of operations to be performed and a plurality of parameters, such as a print volume, a start date, a due date, quantities associated with various finishing steps and/or the like.

Based on the set of operations to be performed for each particular print job, a number of feasible routes may be determined 20 for processing the print job. A feasible route is a sequential set of resources that are collectively able to process the print job and the order in which the resources must be configured. A feasible route includes one or more resources in one or more autonomous cells that may be used to completely process the print job by collectively performing each operation in the set of operations for the print job. An autonomous cell may include one or more resources for performing operations for print jobs. In an embodiment, each feasible route may be determined 210 for a particular print job.

A job processing time may be determined 215 for each feasible route for the particular print job. The job processing time is the amount of time required to process the print job via the feasible route. In an embodiment, the job processing time for a print job may be computed as if the print job is the only one being performed (i.e., as if no interaction between jobs exists).

The print job may initially be assigned 220 to a first feasible route. The print job may be assigned 220 to a feasible route using any known assignment algorithm. For example, the print job may be assigned 220 to the feasible rout having the lowest processing time for the print job. Alternately, the print job may be assigned 220 to a random feasible route. Alternate methods of assigning a print job to a feasible route will be apparent to those of ordinary skill in the at.

The print job workflow management system may then determine 225 whether all print jobs have been assigned to a first feasible route. If not, the process may return to step 210 to process an additional print job.

Otherwise, an objective function may be evaluated 230 to determine a first value. The first value for the objective function may be based on the total processing time for each autonomous cell to process each print job assigned to the autonomous cell. In an embodiment, the objective function may be a min-max algorithm in which the processing time for each autonomous cell is determined and the maximum processing time for an autonomous cell is selected. A first set of feasible routes for the print jobs having a smaller maximum processing time is considered to be better than a second set of feasible routes having a larger maximum processing time. In other words, the objective function may be determined by minimizing the following expression:

$$\max_{i=1 \text{ to \# of cells}} (ProcTime_i).$$

In an alternate embodiment, the objective function may be a sum of squares algorithm in which the processing time for each autonomous cell is squared, and the sum of the squared processing times is determined. A first set of feasible routes for the print jobs having a smaller sun is considered to be better than a second set of feasible routes having a larger sum. In other words, the objective function may be determined by minimizing the following expression:

$$\sum_{i=1}^{\# \text{ of cells}} (ProcTime_i)^2.$$

Alternate objective functions may also be used within the scope of this disclosure.

A print job may be selected 235 form the plurality of print jobs based on the number of feasible routes for each print job. In an embodiment, a print job may be selected 235 with a probability determined by dividing the number of feasible routes for the print job by the sum of the number of feasible routes for all print jobs. For example, if a first print job has 5 feasible routes and a second print job has 10 feasible routes, the first print job may be selected with probability 5/15 (33%), and the second print job may be selected with probability 10/15 (67%).

A second feasible route may be selected 240 for the selected print job based on the job processing time for each feasible route for the selected print job. In an embodiment, the feasible route for the print job may be selected 240 with a probability determined by dividing the inverse of the processing time for the feasible route by the sum of the inverses of the processing time for all feasible routes for the selected print job. For example, if three feasible routes have processing times of 2, 4 and 8 units, the first route would be selected with probability $$\frac{1/2}{1/2 + 1/4 + 1/8} = 57\%,$$

the second route would be selected with probability $$\frac{1/4}{1/2 + 1/4 + 1/8} = 29\%$$

and the third route would be selected with probability $$\frac{1/8}{1/2 + 1/4 + 1/8} = 14\%.$$

A second value for the objective function may then be determined 245 based on the processing time for each autonomous cell to process each print job assigned to the autonomous cell including the second feasible route. In other words, the second feasible route may be substituted for the first feasible route for the selected print job, and the objective function may be evaluated for the new set of feasible routes to determine 245 the second value. The objective function may be the same function determined in step 230.

A determination may be made 250 as to whether the second value is less than a third value. In an embodiment, the third value may equal a sum of the first value and a threshold. As such, sets of feasible routes that are not much worse than the previous set of feasible routes may be considered. This may enable more alternative sets of feasible routes to be considered than if only improved sets of feasible routes were selected. If the second value is less than the third value, the print job may be reassigned 255 to the second feasible route, and the first value for the objective function may be replaced 260 with the second value.

A determination may then be made 262 as to whether to perform the process of selecting an alternate feasible route again. If so, the process may return to step 235. This determination may be made 262 at least until the process has been performed for each print job. In an alternate embodiment, a determination may be made 262 to perform process steps 235-250 (and potentially steps 255 and 260) a plurality of times.

The plurality of print jobs may then be processed 265 using the assigned feasible routes. The assigned feasible routes may include the set of feasible routes resulting from the last reassignment of a print job to a second feasible route or, if no print job is reassigned to a second feasible route, the set of feasible routes resulting from the assignment of print jobs to first feasible routes.

In an embodiment, the threshold may be reduced over time. For example, once a set of feasible routes and the value for an objective function are determined, the threshold may be reduced before performing the relevant steps of the process again. This may cause the algorithm to hone in on a more optimal solution (i.e., set of feasible routes) with subsequent iterations by excluding solutions that are sub-optimal.

Figure 3:
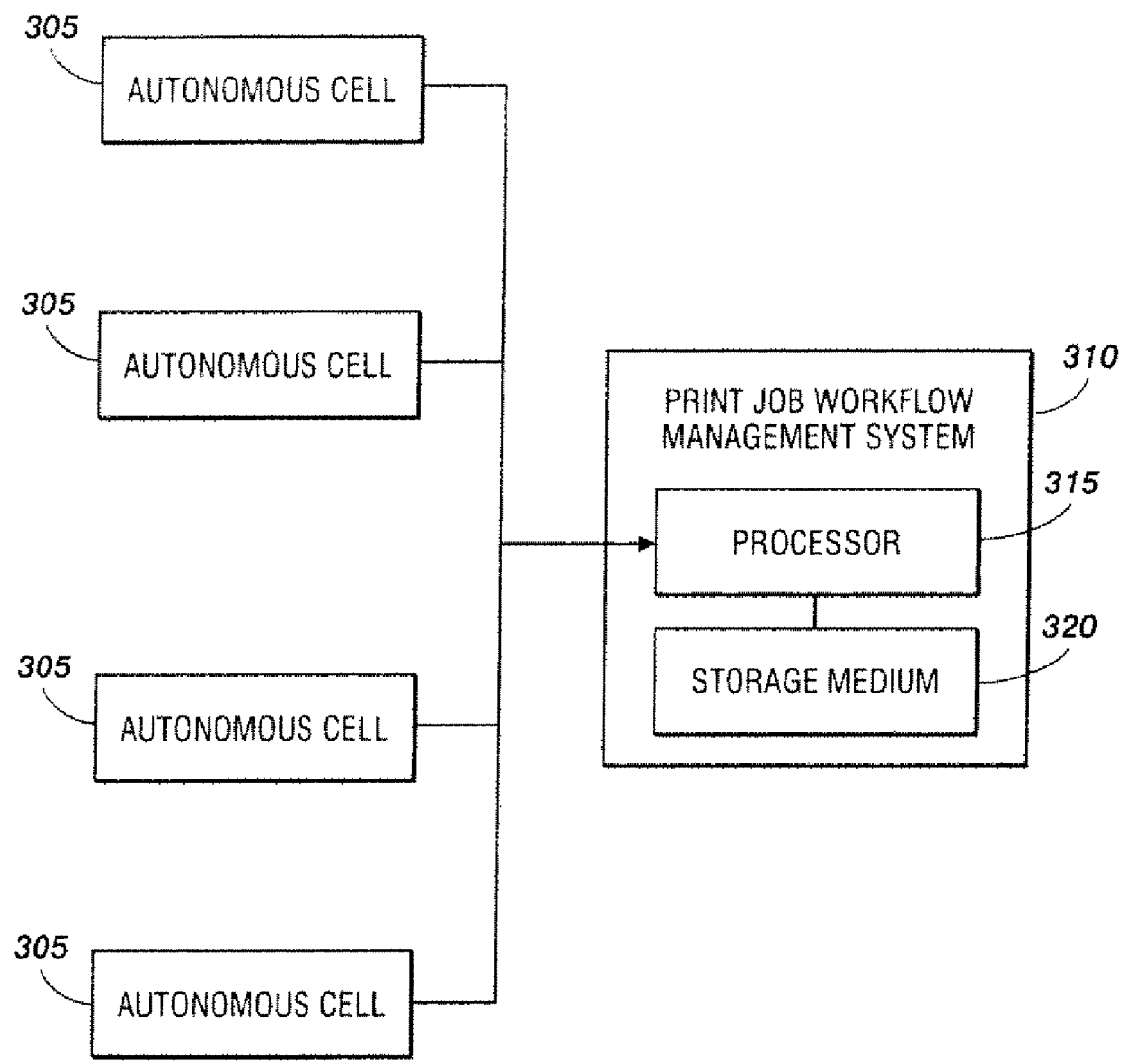
FIG. 3 depicts a block diagram for an exemplary system for processing a plurality of print jobs in a document production environment.

FIG. 3 depicts a block diagram for an exemplary system for processing a plurality of print jobs in a document production environment. The system may include a plurality of autonomous cells 305 and a print job workflow management system 310. Each autonomous cell 305 may include one or more resources for processing a print job. In an embodiment, each autonomous cell 305 includes sufficient resources to process at least one type of print job that is commonly received by the document production environment.

The print job workflow management system 310 may be used to process the received print jobs and determine routes for the print jobs. Each route may include resources in at least one autonomous cell 305. In an embodiment, the print job workflow management system 310 is computer-implemented in that it includes a processor 315 and a processor-readable storage medium 320 that contains programming instructions for receiving print jobs and determining routes for the received print jobs.

The print job workflow management system 310 may be configured to receive print jobs, determine feasible routes for each print job, determine a job processing time for each feasible route and assign each print job to a feasible route for the print job. The print job workflow management system 310 may further be configured to determine a first value for an objective function, select a print job for which to assign a new feasible route, determine the feasible route to assign to the selected print job and compute a second value for the object function. If the second value is less than a third value, the print job workflow management system 310 may reassign the selected print job to the selected feasible route and replace the first value with the second value. The third value may equal the sum of the first value and a threshold.

The print job workflow management system 310 may determine a set of feasible routes for the received print jobs by minimizing the value of an objective functions. The objective function may be based on the processing time for each autonomous cell 305. For example, the objective function may be determined by determining the autonomous cell 305 that has the maximum cell processing time and setting the value of the objective function to that cell processing time. Alternately, the value of the objective function may be determined by calculating a sum of the squares of the cell processing times for each autonomous cell 305. Additional objective functions may also be used within the scope of this disclosure.

EXAMPLE

The scheduling algorithm described above was simulated using a number of datasets representing real world data. Comparisons were made with an existing scheduling algorithm to determine whether the modified algorithm improved performance and route selection.

Table 1 displays the amount of time for each algorithm to converge based on six data sets.

TABLE 1

| Data Set | Time for Existing Scheduling Algorithm to Converge (sec) | Time for Proposed Scheduling Algorithm to Converge (sec) |
|---|---|---|
| 1 | 30 | 25 |
| 2 | 5 | 5 |
| 3 | 8 | 8 |
| 4 | 9 | 6 |
| 5 | 23 | 7 |
| 6 | 12 | 4 |

Table 2 depicts the number of print jobs that were completed after a due date for the print job based on the six data sets for each of the existing and proposed scheduling algorithms.

TABLE 2

| Data Set | # of Late Print Jobs/Total # of Print Jobs (Existing) | # of Late Print Jobs/Total # of Print Jobs (Proposed) |
|---|---|---|
| 1 | 39/6143 | 39/6143 |
| 2 | 1/25 | 1/25 |
| 3 | 0/3970 | 0/3970 |
| 4 | 11/354 | 12/354 |
| 5 | 11/680 | 9/680 |
| 6 | 13/111 | 4/111 |

Table 3 depicts the maximum lateness of print jobs based on the six data sets for each of the existing and proposed scheduling algorithms,

TABLE 3

| Data Set | Maximum Lateness for Existing Scheduling Algorithm (min) | Maximum Lateness for Proposed Scheduling Algorithm (min) |
|---|---|---|
| 1 | 117.07 | 117.07 |
| 2 | 2.84 | 2.84 |
| 3 | 0 | 0 |
| 4 | 164.03 | 161.2 |
| 5 | 183.07 | 172.09 |
| 6 | 166.5 | 93.55 |

Table 4 depicts exemplary print job allocations to various feasible routes for the sixth data set above for each of the existing and proposed scheduling algorithms. Cells 1, 2 and 3 and the Offset Cell refer to autonomous cells in a document production environment. Cell 3 and the Offset cell differ substantially from cell 2 in terms of the devices included in the cells. Feasible routes may include one or more autonomous cells. Feasible routes that are inter-cell include processing delays for moving the print job from the first cell to the second cell. As shown in Table 4, the existing scheduling algorithm resulted in numerous print jobs being assigned to cell 1 to the exclusion of the other cells even when other cells had the capability to process the jobs. The proposed scheduling algorithm resulted in a more even distribution of print jobs between Cells 1 and 2. The more even distribution resulted in a reduced maximum late job time as shown in Table 3.

TABLE 4

Job Allocation to Various Cells

| Algorithm Type | Cell 1 | Cell 2 | Cell 1 & Cell 2 (Inter-cell Movement) | Cell 3 | Cell 2 & Cell 3 (Inter-cell Movement) | Offset Cell |
|---|---|---|---|---|---|---|
| Existing Algorithm | 68 | 13 | 8 | 15 | 6 | 1 |
| Proposed Algorithm | 50 | 37 | 10 | 9 | 7 | 1 |

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A computer-implemented method of processing a plurality of print jobs in a document production environment, the method comprising:
for each of a plurality of print jobs:
determining, by a print job workflow management system, a number of feasible routes for processing the print job, wherein each feasible route comprises at least one resource in at least one of a plurality of autonomous cells, wherein each autonomous cell comprises one or more resources,
for each feasible route, determining a job processing time comprising an amount of time required to process the print job via the feasible route, and
assigning, by the print job workflow management system, the print job to a first feasible route;
determining, by the print job workflow management system, for each of the plurality of autonomous cells, a first value for an objective function based on a total processing time for the autonomous cell to process each print job assigned to the autonomous cell based on the first feasible routes for each of the plurality of print jobs;
selecting an assigned print job based on the number of feasible routes for each of the plurality of print jobs;
selecting a second feasible route for the assigned print job based on the job processing time for each feasible route for the assigned print job;
determining, by the print job workflow management system, for each of the plurality of autonomous cells, a second value for the objective function based on the total processing time for the autonomous cell to process each print job assigned to the autonomous cell based on the second feasible route for the assigned print job and the first feasible routes for the other print jobs of the plurality of print jobs;
if the second value is less than a sum of the first value and a threshold:
reassigning, by the print job workflow management system the assigned print job to the second feasible route, and
replacing the first value with the second value;
repeating at least said selecting the assigned print job, said selecting the second feasible route, and said determining the second value a plurality of times for each of the plurality of print jobs; and
processing the plurality of print jobs based on the assigned feasible routes.

2. The method of claim 1 wherein determining the first value for the objective function comprises:
for each autonomous cell, determining a total processing time for the autonomous cell to process each print job assigned to the autonomous cell; and
determining a maximum total processing time based on the total processing time for each autonomous cell.

3. The method of claim 1 wherein selecting the assigned print job comprises:
for each of the plurality of print jobs, determining the number of feasible routes for the print job;
summing the number of feasible routes for each of the plurality of print jobs to produce a total number of feasible routes;
for each of the plurality of print jobs, assigning a selection probability equal to the number of feasible routes for the print job divided by the total number of feasible routes; and
selecting the assigned print job using the selection probabilities for the print jobs.

4. The method of claim 1 wherein selecting the second feasible route comprises:
for each feasible route for the assigned print job determining an inverted processing time for the feasible route equal to one divided by the processing time for the feasible route;
summing the inverted processing times for each feasible route to produce a total inverted processing time;
for each feasible route, assigning a selection probability equal to the inverted processing time for the feasible route divided by the total inverted processing time; and
selecting the second feasible route using the selection probabilities for the feasible routes.

5. The method of claim 1 wherein determining the second value for the objective function comprises:
for each autonomous cell, determining a total processing time for the autonomous cell to process each print job assigned to the autonomous cell; and
determining a maximum total processing time based on the total processing time for each autonomous cell.

6. The method of claim 1, further comprising reducing the threshold.

7. A system having a processor for processing a plurality of print jobs in a document production environment, the system comprising:
a plurality of autonomous cells, wherein each autonomous cell is configured to process print jobs, wherein each autonomous cell comprises one or more resources; and
a print job workflow management system configured to:
for each of a plurality of print jobs:
determine a number of feasible routes for processing the print job, wherein each feasible route comprises at least one resource in at least one of the plurality of autonomous cells,
for each feasible route, determine a job processing time comprising an amount of time required to process the print job via the feasible route, and
assign the print job to a first feasible route,
determine, for each of the plurality of autonomous cells, a first value for an objective function based on a total processing time for the autonomous cell to process each print job assigned to the autonomous cell based on the first feasible routes for each of the plurality of print jobs, select an assigned print job based on the number of feasible routes for each print job, select a second feasible route for the assigned print job based on the job processing time for each feasible route for the assigned print job, determine, for each of the plurality of autonomous cells, a second value for the objective function based on the total processing time for the autonomous cell to process each print job assigned to the autonomous cell based on the second feasible route for the assigned print job and the first feasible routes for the other print jobs of the plurality of print jobs, and if the second value is less than a sum of the first value and a threshold:
  reassign the assigned print job to the second feasible route, and
  replace the first value with the second value, wherein the print job workflow management system is configured to perform at least said selecting the assigned print job, said selecting the second feasible route, and said determining the second value a plurality of times for each of the plurality of print jobs.

8. The system of claim 7 wherein the print job workflow management system is configured to determine the first value for the objective function by:

for each autonomous cell, determining a total processing time for the autonomous cell to process each print job assigned to the autonomous cell; and determining a maximum total processing time based on the total processing time for each autonomous cell.

9. The system of claim 7 wherein the print job workflow management system is configured to select the assigned print job by:

for each of the plurality of print jobs, determining the number of feasible routes for the print job;

summing the number of feasible routes for each of the plurality of print jobs to produce a total number of feasible routes;

for each of the plurality of print jobs, assigning a selection probability equal to the number of feasible routes for the print job divided by the total number of feasible routes, and selecting the assigned print job using the selection probabilities for the print jobs.

10. The system of claim 7 wherein the print job workflow management system is configured to select the second feasible route by:

for each feasible route for the assigned print job, determining an inverted processing time for the feasible route equal to one divided by the processing time for the feasible route;

summing the inverted processing times for each feasible route to produce a total inverted processing time;

for each feasible route, assigning a selection probability equal to the inverted processing time for the feasible route divided by the total inverted processing time; and selecting the second feasible route using the selection probabilities for the feasible routes.

11. The system of claim 7 wherein the print job workflow management system is configured to determine the second value for the objective function by:

for each autonomous cell, determining a total processing time for the autonomous cell to process each print job assigned to the autonomous cell; and determining a maximum total processing time based on the total processing time for each autonomous cell.

12. The system of claim 7 wherein the print job workflow management system is further configured to reduce the threshold.

13. A computer-implemented method of processing a plurality of print jobs, the method comprising:

for each of the plurality of print jobs, assigning a first feasible route selected from a plurality of feasible routes, wherein each of the plurality of feasible routes comprises at least one resource in at least one of a plurality of autonomous cells, wherein each of the plurality of autonomous cells comprises one or more resources, determining a first value for an objective function based on a total processing time for each of the plurality of autonomous cells to process each print job assigned to each autonomous cell based on the first feasible routes for each of the plurality of print jobs;

selecting one of the plurality of print jobs based on the number of feasible routes for each of the plurality of print jobs;

selecting a second feasible route for the selected print job based on the job processing time for each feasible route for the selected print job;

determining a second value for the objective function based on the total processing time for each autonomous cell to process each print job assigned to each autonomous cell based on the second feasible route for the assigned print job and the first feasible routes for the other print jobs of the plurality of print jobs, if the second value is less than a sum of the first value and a threshold:
  reassigning the selected print job to the second feasible route, and
  replacing the first value with the second value; and processing the plurality of print jobs based on the assigned feasible routes.

14. The method of claim 8 wherein selecting one of the plurality of print jobs comprises:

for each print job, determining the number of feasible routes for the print job, summing the number of feasible routes for each print job to determine a total number of feasible routes;

for each print job, assigning a selection probability equal to the number of feasible routes for the print job divided by the total number of feasible routes; and selecting one of the plurality of print jobs using the selection probabilities for the print jobs.

15. The method of claim 13 wherein selecting the second feasible route comprises:

for each feasible route for the selected print job, determining an inverted processing time for the feasible route equal to one divided by the processing time for the feasible route, summing the inverted processing times for each feasible route to produce a total inverted processing time;

for each feasible route, assigning a selection probability equal to the inverted processing time for the feasible route divided by the total inverted processing time; and selecting the second feasible route using the selection probabilities for the feasible routes.

16. The method of claim 13, further comprising reducing the threshold.

* * * * *